United States Patent
Miebach et al.

(10) Patent No.: US 10,151,364 B2
(45) Date of Patent: Dec. 11, 2018

(54) ACTIVATING A PARKING BRAKE

(71) Applicant: GKN Automotive Ltd., Redditch, Worcestershire (GB)

(72) Inventors: Sascha Miebach, Neunkirchen-Seelscheid (DE); Marc Eck, Neunkirchen-Seelscheid (DE)

(73) Assignee: GKN Automotive Ltd., Redditch, Worcestershire (GB)

( * ) Notice: Subject to any disclaimer, the term of this patent is extended or adjusted under 35 U.S.C. 154(b) by 0 days.

(21) Appl. No.: 15/599,513

(22) Filed: May 19, 2017

(65) Prior Publication Data

US 2017/0343067 A1    Nov. 30, 2017

(30) Foreign Application Priority Data

May 24, 2016    (DE) .................. 10 2016 109 553

(51) Int. Cl.

| B60T 1/00 | (2006.01) |
| --- | --- |
| B60T 1/06 | (2006.01) |
| B60T 13/66 | (2006.01) |
| B60T 13/68 | (2006.01) |
| F16D 63/00 | (2006.01) |
| F16D 65/16 | (2006.01) |
| F16D 121/14 | (2012.01) |
| F16D 125/66 | (2012.01) |
| F16D 125/68 | (2012.01) |

(52) U.S. Cl.
CPC .............. *F16D 65/16* (2013.01); *B60T 1/005* (2013.01); *B60T 1/062* (2013.01); *B60T 13/66* (2013.01); *B60T 13/686* (2013.01); *F16D 63/006* (2013.01); *B60T 13/662* (2013.01); *F16D 2121/14* (2013.01); *F16D 2125/66* (2013.01); *F16D 2125/68* (2013.01)

(58) Field of Classification Search
None
See application file for complete search history.

(56) References Cited

FOREIGN PATENT DOCUMENTS

| CN | 103574023 A | 2/2014 |
| --- | --- | --- |
| CN | 104358866 A | 2/2015 |
| CN | 105333140 A | 2/2016 |
| DE | 4127991 A1 | 2/1993 |
| DE | 10 2011 080 498 A1 | 2/2013 |
| DE | 10 2012 010 172 A1 | 11/2013 |
| EP | 2 878 860 A1 | 6/2015 |
| JP | 2013543964 A | 12/2013 |

OTHER PUBLICATIONS

English Translation of Chinese Office Action for CN Application No. 201710367542.6 dated Aug. 28, 2018 (3 pages).

*Primary Examiner* — Jacob S. Scott
(74) *Attorney, Agent, or Firm* — Bejin Bieneman PLC

(57) ABSTRACT

An actuator element is provided for a parking brake that has a mechanically acting actuating mechanism and that can be coupled via a shiftable clutch device to a pump drive of a hydraulic system of a primary assembly by means of a shiftable clutch device in order to activate the parking brake.

18 Claims, 1 Drawing Sheet

ACTIVATING A PARKING BRAKE

CROSS-REFERENCE TO RELATED APPLICATIONS

This application claims priority to German Application No. DE 10 2016 109 553.2, filed on May 24, 2016, which application is hereby incorporated herein by reference in its entirety.

The present disclosure relates to an activation system for activating a parking brake of a motor vehicle, in particular of a passenger vehicle, which is provided as a secondary functional part of primary components, to be supplied with pressurized oil, cooling oil and/or lubricating oil, of a primary assembly, comprising an actuator element for transferring the parking brake from a release position into a locking position and/or from the locking positon into a release position, and a pump device for generating a hydraulic pressure and/or a hydraulic volume flow for supplying the primary components with pressurized oil, cooling oil and/or lubricating oil, wherein the pump device is assigned pump drive elements, in particular an electric motor which drives the pump and preferably at least one drive shaft via which the pump device is driven when necessary.

The present disclosure also encompasses a motor vehicle having such a parking brake activation system, a primary assembly having such a parking brake activation system or said primary assembly, a method for actuating such a system, a computer program product for an electronic control unit for actuating such a system and an electronic control unit which is supplied with data with such a computer program product.

Activation systems for activating a parking brake which are provided as a secondary functional part of a primary assembly which has a multiplicity of primary components which are to be supplied with pressurized oil, cooling oil and/or lubricating oil are basically known. A primary assembly is understood here to mean, in particular, drive train assemblies of a motor vehicle such as power takeoff units (PTUs), differentials, (automatic) transmissions and similar assemblies of a motor vehicle which are provided with a hydraulic system whose primary function is, however, not that of a parking brake, but into which a parking brake can be well integrated as an additional secondary functional part. The primary assembly is preferably a gear mechanism and the parking brake is functionally integrated into the hydraulic system of the gear mechanism.

A known system, having a hydraulic actuating mechanism for an actuator element which is to be activated, is shown in FIG. 1. It is a disadvantage of such a system that a relatively costly and therefore expensive hydraulic system has to be provided with which the various hydraulic components, for example the various line strands leading to the actuator element and 4/2 slide valve which is responsible for actuating the latter, must be able to be supplied with pressurized oil, lubricating oil or cooling oil. Such a hydraulic system requires a multiplicity of components, a large amount of installation space, and an increased expenditure on regulation. Owing to the risk of air or contaminants penetrating the hydraulic system and owing to the occurrence of pressure peaks during the necessary closed-loop and open-loop control processes (in particular when the actuator element end positions are reached), such a system is comparatively susceptible to faults. In addition, a locking latching means which is to be actuated by means of a control device is provided, said locking latching means preventing the actuator element which is under pre-stress from being pressed back into the locking positon, and said locking latching means having to be additionally actuated and giving rise to additional requirements of components and installation space as well as costs.

Disclosed herein is an activation system for activating a parking brake of a motor vehicle of the type above, which requires the smallest possible number of simple, robust and economical components which have a low level of susceptibility to fault, and at the same time have a low requirement for installation space and a system architecture which is as low in complexity as possible and which permits simple actuation and integration of the parking brake into the primary assembly, and a simple method for locking or unlocking the parking brake.

With respect to the hydraulic activation system, the actuator element has a mechanically acting actuating mechanism and can be coupled at least indirectly, via a shiftable clutch device, to the pump device or to the pump drive elements assigned to the pump device, in such a way that when the clutch device is closed the parking brake can be transferred from the release position into the locking position and/or from the locking position into the release position by means of the mechanically acting actuating mechanism and, in particular, driven at least indirectly by the pump drive elements.

With respect to the method, steps include:

bringing about a coupling between the actuator element and the pump device or the pump drive elements assigned to the pump device, by closing a shiftable clutch device, transferring the parking brake from the release position into the locking position and/or from the locking position into the release position by means of a mechanically acting actuating mechanism which is provided on the actuator element, and releasing the clutch device after transferring the parking brake into the locking position from the release position or into the release position from the locking position.

The bringing about of a coupling or the coupling of actuator element and pump device is meant to mean the bringing about of a power-transmitting mechanical connection between the actuator element on the clutch output side and the pump device (pump components which are driven in rotation) or the drive elements which drive the pump device, including the motor-operated pump drive.

As a result of these measures it is possible to largely dispense with an expensive and costly hydraulic system for activating a parking brake, and hydraulic valves can be eliminated. The actuation of the actuator element for the mechanical activation of the parking brake can be carried out solely by closing or opening the clutch device. A costly cable architecture and hydraulic control elements for actuating a hydraulic actuator element as well as the actuator element itself can be dispensed with, and the requirements made of the hydraulic pressure performance of the pump device are reduced. In addition, weight and the need for installation space can be reduced and the functional capability of the system can be maintained even when air enters or when soiling occurs within the hydraulic system.

It is possible that the mechanical actuating mechanism has a drive element and an output element, wherein the drive element is placed in positive locking engagement with the output element by closing the clutch device. Alternatively or additionally the mechanical actuating mechanism can have a drive element and an output element, and the drive element can be set in rotation by closing the clutch device. In particular, in the latter case it is possible that the drive element and the output element are continuously in positive locking engagement with one another, and the mechanical actuating mechanism becomes effective by closing or opening the clutch device, in order to move the output element in a translational fashion or its effectiveness is cancelled out, that is to say the movement of the output element in the translational direction is ended.

It is possible that the actuator element is formed by a spindle drive. The latter has, on the one hand, a spindle rod and, on the other hand, a spindle nut which is continuously in engagement with the spindle rod or can be placed at least temporarily in engagement by means of the clutch device. By driving the drive element (spindle rod or spindle nut) in rotation it is possible to drive the output element (spindle nut or spindle rod) by converting the rotational movement of the drive element into a translational thrust movement by means of a drive thread, and thereby ensure that the parking brake is engaged or released.

The pump device can be driven by electric motor. The electric motor which drives the pump device is the same electric motor which at least indirectly also drives the actuator element and therefore either as a pump drive or as an actuator element drive. "Indirect drive" or "indirect driving" means in this context that the electric motor does not have to be connected directly to the actuator element by means of the clutch device but instead that further pump drive components and, for example, a drive shaft or rotating pump components are integrated into the drive chain and can be intermediately connected between the electric motor and the actuator element.

An electric motor can be provided for driving the pump device, the direction of rotation of which electric motor is reversible and said electric motor therefore in order to transfer the parking brake from the locking position into the release position is capable of rotating in a release direction of rotation, and in order to transfer the parking brake from the release position into the locking position is capable of rotating in a locking direction of rotation opposed to the release direction of rotation. In order also to be able to employ the pump device usefully in both directions of rotation of the electric motor, the pump device can be a hydraulic pump, in particular a gerotor pump, which can be driven in two opposing directions.

Because the hydraulic system is used only secondarily for activating a parking brake and is primarily intended for supplying primary components of the primary assembly with pressurized oil, cooling oil and/or lubricating oil via a supply line, the pump device is connected to a hydraulic supply line.

In summary, in order to provide an activation system of a parking brake there is therefore provision that an actuator element has a mechanically acting actuating mechanism and can be coupled via a shiftable clutch device to a pump drive of a hydraulic system of the primary assembly by means of a clutch device, in order to activate the parking brake.

Further features and advantages can be found in the dependent claims and the following description of exemplary embodiments with reference to the drawings, in which:

FIG. 1 shows a concept which is basically known from the prior art, for activating a parking brake of a motor vehicle by means of an actuator element which has a hydraulic actuating mechanism.

Figure 1:
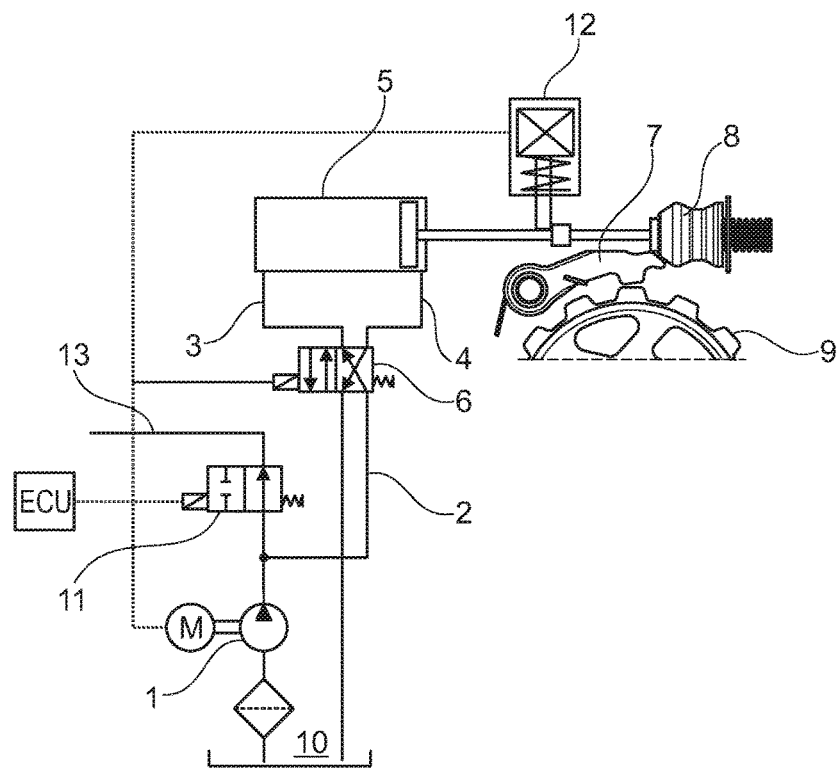
FIG. 1 shows an activation system for hydraulically activating a parking brake of a motor vehicle according to the prior art.

Hydraulic pressure is built up in a pressure line 2 by means of a pump device 1 which is driven by means of an electric motor M. The pressure line is connected to a slide valve 6 (4/2 spool type solenoid valve) which can be actuated electromagnetically and by means of the circuit of which a first line strand 3 or a second line strand 4 can optionally be used as a pressure feed line leading to a hydraulic actuator element 5, while the respective other line strand functions as a largely pressure-free return line.

When hydraulic pressure is applied to the first line strand 3 (this corresponds to the position of the slide valve 6 illustrated in FIG. 1) the parking brake is transferred into a release position by means of the hydraulically activated actuator element 5. In this release positon, an engagement lever 7 of the parking brake, pre-tensioned by means of a spring, is disengaged from a corresponding opposing element, here for example a locking ring 9 which interacts, in a manner not illustrated in the Figure, with a part of the drive train in such a way that when the engagement lever 7 is in engagement with the locking ring 9 the parking brake is activated.

If the 4/2 slide valve 6 is switched starting from the position shown in FIG. 1, and therefore pressure is applied to the second line strand 4, the actuator element 5 is pulled back from the position shown in FIG. 1, with the result that an actuator cam 8, which is pre-tensioned, is positioned against the engagement lever 7 and forces the engagement lever 7 against the locking ring 9 in such a way that the engagement lever enters into a positive locking engagement with the locking ring 9 as soon as the position of the locking ring 9 permits such positive locking engagement to come about (blocking position of the parking brake).

In order to hold the parking brake in the release position shown in FIG. 1, a locking latching means 12 which can be actuated by means of a control device (ECU) is provided, which locking latching means 12 is capable of acting on the actuator element 5 in order to secure it in a position which ensures the release positon of the parking brake.

A supply line 13 which is provided with a hydraulic control valve 11 is connected to the pressure line 2. When the control valve 11 is open, hydraulic fluid as pressurized oil, cooling oil, or lubricating oil can be extracted from the hydraulic circuit shown in FIG. 1 or the hydraulic fluid reservoir 10 and fed via the supply line 13 to other primary components of a primary assembly to which the parking brake activation system is assigned.

The hydraulic activation concept illustrated in FIG. 1, by means of a hydraulic actuating mechanism, has a comparatively costly hydraulic system with a multiplicity of, in particular, hydraulic components, which leads to the disadvantages described at the beginning.

Figure 2:
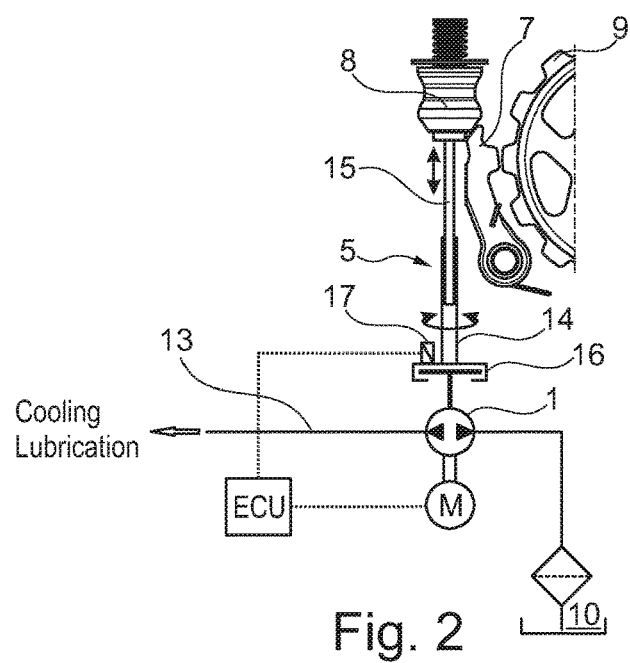
FIG. 2 shows an activation system for activating a parking brake of a motor vehicle having an actuator element which has a mechanical actuating mechanism.

In FIG. 2 the reference symbols which have already been used in FIG. 1 are retained insofar as these reference symbols are assigned to functionally identical components.

FIG. 2 shows, in contrast to FIG. 1, an activation system for activating a parking brake of a motor vehicle which is purely mechanical and therefore does not require a hydraulic actuating mechanism and with which the parking brake can be transferred from the release position shown in FIG. 2 into a locking position or from the locking position into the release position shown in FIG. 2 by coupling to the hydraulic pump 1 and/or to the electric motor M or other pump drive components via a mechanical actuating mechanism of an actuator element 5.

In FIG. 2, a pump device (hydraulic pump 1) is driven electromotively by means of the motor M. The electric motor M can be driven in two opposing directions of rotation, specifically a locking direction of rotation and a release direction of rotation. Furthermore, the pump device 1 can be embodied as a hydraulic pump which is capable of operating bidirectionally. Depending on the direction of rotation in which the motor M rotates, the parking brake, which is constructed in FIG. 2 according to the parking brake described already with respect to FIG. 1, can be engaged or released by coupling a mechanical actuator element 5 to a part of the pump device 1 which is driven in rotation or to a drive element of the drive chain which drives the pump, by means of a clutch device 16.

By closing the clutch device 16 and the associated production of a power-transmitting drive connection between the pump device or the drive elements driving the pump device on the clutch drive side and the actuator element 5 on the clutch output side, a drive element 14 of a mechanical actuating mechanism, which can be formed by a spindle rod or spindle nut, is driven in rotation. The drive element 14 is in engagement with an output element 15 of the mechanical actuating mechanism in such a way that the rotational movement of the drive element 14 is converted into a translational movement of the output element 15 (either a spindle nut or a spindle rod depending on the refinement of the drive element 14). The parking brake is released or engaged depending on the direction of rotation of the electric motor in the release direction of rotation or locking direction of rotation.

Suitable measures ensure that the spindle rod, which functions in FIG. 2 by way of example as the output element 15 of the actuating mechanism, which moves in a translational function, does not rotate along with the spindle nut which is driven in rotation by means of the clutch device 16 and functions in FIG. 2 as a drive element 14 of the mechanical actuating mechanism. When driven by the rotating spindle nut, the spindle rod forces the actuator cam 8, by means of the drive thread of the spindle drive, in the axial direction either into the release position shown in FIG. 2 (motor M rotates in the release direction), or else permits the actuator cam 8 which is pre-tensioned to slide in the opposite direction in that the spindle rod 15 draws back from the position shown in FIG. 2 into a locking position (motor M rotates in the locking direction) in such a way that the actuator cam forces the engagement lever 7, driven by pre-tensioning, into engagement with the locking ring 9 as soon as the locking ring enters into a position which permits engagement of the engagement lever in the locking ring.

As a result of the fact that the output element 15 is secured against rotation about its own axis, the parking brake is also permanently secured in the release position which it assumes when the clutch device is released, without a need for an additional securing mechanism. This is because the internal self-locking of the thread of the spindle drive, together with the securement of the output element 15 against rotation, prevents undesired sliding of the actuator cam 8.

The clutch 16 can be actuated by the same electronic control unit (ECU) which also actuates the hydraulic pump 1 and is activated by means of an actuator 17 which is preferably actuated electromagnetically.

A supply line 13 for supplying primary components of a primary assembly into which the parking brake activation system is integrated is connected to the hydraulic pump 1. Hydraulic fluid can be fed to the respective components via the supply line 13 in order to activate hydraulic actuators or to lubricate components (gearwheels, bearings, clutches etc.).

The invention claimed is:

1. A system for activating a parking brake of a motor vehicle, which parking brake is provided as a secondary part of primary components of a primary assembly to be supplied with pressurized oil, cooling oil, and/or lubricating oil, the system comprising:
    an actuator element for transferring the parking brake at least one of from a release position into a locking position and from the locking position into the release position; and
    a pump device for generating at least one of a hydraulic pressure and a hydraulic volume flow for supplying the primary components with pressurized oil, cooling oil and/or lubricating oil;
    wherein the pump device is drivable by pump drive elements;
    wherein the actuator element provides mechanical actuation and can be coupled at least indirectly via a shiftable clutch device to one of the pump device and the pump drive elements such that the parking brake can be transferred at least one of from the release position into the locking position and from the locking position into the release position by the actuator element.

2. The system of claim 1, wherein the actuator element has a drive element and an output element, wherein the drive element is placed in positive locking engagement with the output element by closing the clutch device.

3. The system of claim 1, wherein the actuator element has a drive element and an output element, and the drive element is set in rotation by closing the clutch device.

4. The system of claim 3, wherein the drive element and the output element are continuously in positively locking engagement with one another such that by closing the clutch device the output element is moved in a translational fashion.

5. The system of claim 1, wherein the actuator element actuating includes a spindle drive.

6. The system of claim 1, wherein the clutch device is electromagnetically activatable.

7. The system of claim 1, wherein the pump device is drivable by an electric motor that at least also indirectly drives the actuator element when the clutch device is closed.

8. The system of claim 1, further comprising an electric motor configured to rotate in a release direction of rotation to transfer the parking brake from the locking position into the release position, and further configured to rotate in a locking direction of rotation opposed to the release direction of rotation to transfer the parking brake from the release position into the locking position.

9. The system of claim 1, further comprising an electronic control unit programmed to cause actuation of the actuatable actuator element.

10. A method for activating a parking brake of a motor vehicle, which parking brake is provided as a secondary part of primary components of a primary assembly to be supplied with pressurized oil, cooling oil, and/or lubricating oil, the method comprising:
    closing a shiftable clutch device to couple an actuator element and at least one of a pump device and pump drive elements for driving the pump device;

transferring the parking brake from at least one of from a release position into a locking position and from the locking position into the release position by the actuator element; and releasing the clutch device after transferring the parking brake from one of into the locking position from the release position and into the release position from the locking position.

11. The method of claim 10, wherein the actuator element has a drive element and an output element, the method further comprising placing the drive element in positive locking engagement with the output element by closing the clutch device.

12. The method of claim 10, wherein the actuator element has a drive element and an output element, the method further comprising setting the drive element in rotation by closing the clutch device.

13. The method of claim 11, further comprising converting a rotational movement of the drive element into a translational movement of the output element to transfer the parking brake from one of into the locking position from the release position and into the release position from the locking position.

14. The method of claim 12, further comprising converting a rotational movement of the drive element into a translational movement of the output element to transfer the parking brake from one of into the locking position from the release position and into the release position from the locking position.

15. The method of claim 10, wherein an electric motor is provided for driving the pump device, and in order to transfer the parking brake from the locking position into the release position the electric motor rotates in a release direction of rotation, and in order to transfer the parking brake from the release position into the locking position it rotates in a locking direction of rotation which is opposed to the release direction of rotation.

16. An electronic control unit for controlling an activation system for activating a parking brake of a motor vehicle, which parking brake is provided as a secondary part of primary components of a primary assembly to be supplied with pressurized oil, cooling oil, and/or lubricating oil, programming of the electronic control unit including programming for:

closing a shiftable clutch device to couple an actuator element and at least one of a pump device and pump drive elements for driving the pump device;

transferring the parking brake from at least one of from a release position into a locking position and from the locking position into the release position by the actuator element; and releasing the clutch device after transferring the parking brake from one of into the locking position from the release position and into the release position from the locking position.

17. The electronic control unit of claim 16, wherein the actuator element has a drive element and an output element, the electronic control unit further programmed for placing the drive element in positive locking engagement with the output element by closing the clutch device.

18. The electronic control unit of claim 16, wherein the actuator element has a drive element and an output element, the electronic control unit further programmed for setting the drive element in rotation by closing the clutch device.

* * * * *